United States Patent [19]

Hara

[11] Patent Number: 5,519,096
[45] Date of Patent: May 21, 1996

[54] COMPOUNDS FOR SOLVENT RESISTANT SILICONE GELS

[75] Inventor: Hiroyasu Hara, Annaka, Japan

[73] Assignee: Shin-Etsu Chemical Co., Ltd., Tokyo, Japan

[21] Appl. No.: 268,926

[22] Filed: Jun. 30, 1994

[30] Foreign Application Priority Data

Jun. 30, 1993 [JP] Japan ................................. 5-186887

[51] Int. Cl.$^6$ ................................................ C08G 77/08
[52] U.S. Cl. ........................... 525/478; 525/479; 528/15; 528/31; 528/42; 528/43
[58] Field of Search ............................ 528/15, 31, 42, 528/43; 525/478, 479

[56] References Cited

U.S. PATENT DOCUMENTS

| | | |
|---|---|---|
| 3,445,426 | 5/1969 | Lee . |
| 4,719,275 | 1/1988 | Benditt et al. .................... 528/15 |
| 5,037,932 | 8/1991 | Maxson et al. ................... 528/15 |
| 5,059,649 | 10/1991 | Maxson et al. .................. 524/398 |
| 5,064,889 | 11/1991 | Ikeno .............................. 524/188 |
| 5,332,795 | 7/1994 | Fujiki et al. ..................... 525/478 |

*Primary Examiner*—Mark D. Sweet
*Attorney, Agent, or Firm*—Millen, White, Zelano, & Branigan

[57] ABSTRACT

A composition for a solvent resistant silicone gel which comprises (A) 100 weight parts of branched organopolysiloxane having vinyl groups which contains:

| | |
|---|---|
| $(CF_3-CH_2-CH_2)(CH_3)SiO$ units | 70.0–98.5 mol %  |
| $RSiO_{1.5}$ units | 0.5–10.0 mol %, and |
| $(CH_2=CH)(CH_3)_2SiO_{0.5}$ units | 1.0–10.0 mol %, | where R is a group selected from a 3,3,3-trifluoropropyl group, a phenyl group, a methyl group and a vinyl group, (B) 0.1 to 30 weight parts of organohydrogen polysiloxane having at least one hydrogen atom bound to a silicon atom within the molecule, and (C) an addition reaction catalyst. The composition can form a cured silicone gel product which possesses a superior solvent resistance towards, for example, gasoline, while maintaining flexibility at low temperature.

17 Claims, No Drawings

COMPOUNDS FOR SOLVENT RESISTANT SILICONE GELS

This invention relates to compounds for solvent resistant silicone gels, particularly the type of silicone gels which do not lose flexibility at low temperature.

BACKGROUND OF THE INVENTION

Since silicone gels exhibit superior properties in electrical insulation, stability of their electric characteristics, and their flexibility, they are conventionally utilized for the potting and sealing of electric and electronic parts. Particularly, they find use as a cladding material for the control circuit elements in power transistors, integrated circuits (ICs) and condensers, in order to protect them from thermal and mechanical damage. However, the characteristics of conventional silicone gels are not sufficient enough to make them fully applicable to the recent trends in all-electronic automobiles. New silicone gels for this purpose are in demand that further possess a solvent resistance towards hydrocarbon fluids and gasoline, as well as maintain flexibility at low temperature.

Conventionally, linear organopolysiloxanes having 3,3,3-trifluoropropyl groups have been recommended as a component for silicone gel compositions which offer solvent resistance. In order to improve the solvent resistance towards hydrocarbon fluids and gasoline, the ratio of 3,3,3-trifluoropropyl groups in the linear organopolysiloxane must be as high as possible. However, a higher content of 3,3,3-trifluoropropyl groups will lead to the problem that the flexibility is reduced at low temperature. Therefore, the purpose of this invention is to offer compositions for silicone gels which offer a superior solvent resistance towards, for example, gasoline, as well as maintain flexibility at low temperature.

SUMMARY OF THE INVENTION

An object of this invention is to provide compositions for solvent resistant silicone gels which comprise: (A) 100 parts by weight of a branched organopolysiloxane containing:

| | |
|---|---|
| $(CF_3-CH_2-CH_2)(CH_3)SiO$ units | 70.0–98.5 mol % |
| $RSiO_{1.5}$ units | 0.5–10.0 mol %, and |
| $(CH_2=CH)(CH_3)_2SiO_{0.5}$ units | 1.0–10.0 mol %, | wherein R is a group selected from the 3,3,3-trifluoropropyl group, a phenyl group, a methyl group and a vinyl group, (B) 0.1 to 30 weight parts of an organohydrogen polysiloxane having at least one hydrogen atom bound to a silicon atom within the molecule, and (C) an addition reaction catalyst.

In this invention, a silicone gel means the cured silicone product, wherein its penetration, measured by using the ¼ scale cone as defined in the ASTM D 1403, ranges from 0 to 200, preferably 10 to 120, particularly preferably 20 to 100.

Upon further study of the specification and appended claims, further objects and advantages of this invention will become apparent to those skilled in the art.

(A) Branched Organopolysiloxane Having Vinyl Groups

In this invention, the branched organopolysiloxane having vinyl groups, component (A), is utilized as a base component and, as described above, it contains:

| | |
|---|---|
| $(CF_3-CH_2-CH_2)(CH_3)SiO$ units | 70.0–98.5 mol % |
| $RSiO_{1.5}$ units | 0.5–10.0 mol %, and |
| $(CH_2=CH)(CH_3)_2SiO_{0.5}$ units | 1.0–10.0 mol %, | wherein R is a group selected from the 3,3,3-trifluoropropyl group, a phenyl group, a methyl group and a vinyl group. In addition, the organopolysiloxane may contain at most 10 mol % of, for example, $(CH_3)_3SiO_{0.5}$ units.

Preferably, the $(CF_3-CH_2-CH_2)(CH_3)SiO$ units are present in an amount of 75 to 95 mol %.

The $(CH_2=CH)(CH_3)_2SiO_{0.5}$ units are preferably present in an amount of 1.0 to 8.0 mol %, more preferably from 3.0 to 7.0 mol %, in the branched organopolysiloxane.

The $RSiO_{1.5}$ units provide the branching in the siloxane chain of the organopolysiloxane and the branched organopolysiloxane should comprise these groups in the amount of 0.5 to 10.0 mol %, preferably from 2.0 to 5.0 mol %. A content of the $RSiO_{1.5}$ units less than 0.5 mol % may reduce the flexibility at low temperature, while more than 10 mol % will make the preparation of the branched organopolysiloxane difficult.

Further, the ratio of vinyl groups within the organic groups bound to silicon atoms in the branched organopolysiloxane is preferably from 0.5 to 8.0 mol %, more preferably from 3.0 to 7.0 mol %. When the ratio of the vinyl groups becomes too small, the density of crosslinking will be low, resulting in difficulties, such as that the product will not be cured properly. On the other hand, too much vinyl group content makes the produced cured gel so hard that it will not function as a gel. The vinyl groups in the branched organopolysiloxane may be present in the $(CH_2=CH)(CH_3)_2SiO_{0.5}$ units and the $RSiO_{0.5}$ units, where R is a vinyl group. However, preferably the vinyl groups, are only from the $(CH_2=CH)(CH_3)_2SiO_{0.5}$ units due to ease in synthesis.

The branched organopolysiloxane may be prepared by, for example, the following Preparation Methods 1 and 2.

1) Preparation Method 1

The branched organopolysiloxane may be prepared by the ring-opening polymerization of raw materials, such as cyclic trimers of methyl-3,3,3-trifluoropropyl siloxane, vinyl group containing organodisiloxane, and co-hydrolyzed products of silanes having $RSiO_{1.5}$ units, which are obtained by the co-hydrolysis of organotrichlorosilanes with other chlorosilanes. The ring-opening polymerization is conducted in the presence of an equilibration catalyst selected from the group of alkali catalyst and acid catalysts. Examples of the alkali catalysts are: hydroxides of alkali metals such as potassium hydroxide and sodium hydroxide; and tetraalkyl phosphonium hydroxide, tetraalkyl ammonium hydroxide and their silanolates. Examples of the acid catalysts are: sulfuric acid, methane sulfonic acid and trifluoromethane sulfonic acid.

2) Preparation Method 2

The branched organopolysiloxane may also be prepared by the following method. At first, a ring-opening polymerization of product is prepared by performing a ring-opening polymerization of cyclic trimers of methyl-3,3,3-trifluoropropyl silane, in the presence of water, organosiloxanes, organopolysiloxanesend-blocked with silanols, triorganosilanols, diorganosilane diols, and organosilane triols, etc., by utilizing a penta-coordinated silicon catalyst, at a temperature of at most 50° C., preferably from 0° to 20° C. By this reaction, methyl-3,3,3-trifluoropropyl silane units propagate from the silanol starting points. After this polymerization, the propagation points of the polymers are silanols. Then the branched organo-polysiloxane is prepared through the silylation of the molecular terminals of the ring-opening polymerization product, by utilizing a vinyl group containing silylation agent such as vinyl diorganohalogeno silanes, divinyltetraorganodisilazanes and vinyldiorganosilyl ketene acetals in the presence of acids or alkalis. The amount of the silylation agent is chosen to provide sufficient silylation depending upon the number of vinyl groups introduced into the molecule. For example, the silylation may be used in an amount of 0.5 to 30 parts by weight, preferably 0.5 to 10 parts by weight, based on 100 parts by weight of the polymerized organosiloxane. The products are then obtained through separation by distillation, filtration, etc., steps.

In Preparation Method 2, a ring-opening polymerization temperature exceeding 50° C. will lead to a large amount of byproducts, cyclic tetramers and pentamers of methyl-3,3,3-trifluoropropylsiloxane (below these are expressed as $F_4$ and $F_5$, respectively). These $F_4$ and $F_5$ byproducts cannot be completely eliminated by distillation under reduced pressure. Therefore, a cured product of the composition utilizing the branched organopolysiloxane prepared by the ring-opening polymerization above 50° C., contains a large amount of $F_4$ and $F_5$ byproducts which do not contribute to the crosslinking reaction. When the cured product is exposed to the environment of solvents, $F_4$ and $F_5$ are extracted by the solvents. As a result, the product will not be able to maintain flexibility and its solvent resistance becomes insufficient, resulting in the loss of the characteristics of a gel itself.

Among the products obtained by the two preparation methods exemplified above, the branched organopolysiloxane obtained by the ring-opening polymerization of cyclic trimers of methyl-3,3,3-trifluoropropyl siloxane in the presence of an equilibration catalyst, as described in Preparation Method 1, is superior in solvent resistance by itself. However this method also produces a larger amount of byproducts, e.g., $F_4$ and $F_5$ by-products, which do not contribute to the crosslinking reaction. When the cured product is exposed to the environment of solvents, $F_4$ and $F_5$ are extracted by the solvents. As a result, the product will not be able to maintain flexibility and its solvent resistance becomes insufficient, resulting in the loss of the characteristics of a gel itself. However, the ring-opening polymerization product, which is prepared through the ring-opening polymerization of cyclic trimers of methyl-3,3,3-trifluoropropyl siloxane in the presence of the penta-coordinated silicon catalyst at the temperature of at most 50° C. as described in Preparation Method 2, contains low amounts of the by-products, $F_4$ and $F_5$. For example, the content of $F_4$ and $F_5$ in the branched organopolysiloxane derived from this ring-opening polymerization product is at most 6 weight %. Therefore, when the branched organopolysiloxane derived from this ring-opening polymerization product is utilized as a base component, the gel formed by this composition can better maintain its flexibility and present a good solvent resistance, since there is very little content of $F_4$ and $F_5$ which are solvent extractable components. It is, therefore, preferable to utilize the branched organopolysiloxane obtained by the Preparation Method 2.

Various types of compounds are utilized as the penta-coordinated silicon catalyst for Preparation Method 2. Listed below is an example, which is particularly suitable for this invention.

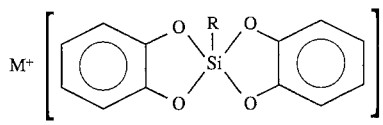

In the above formula, $M^+$ is either $BzMe_3N^+$, $Bu_4N^+$, $Me_4N^+$, $Li^+$, $Na^+$ or $K^+$, wherein Me, Bu and Bz are a methyl group, a butyl group, and a benzyl group, respectively, and R is selected from a 3,3,3-trifluoropropyl group, a phenyl group, a methyl group and a vinyl group. The Me, Bu, Bz designations have the same meaning when used below. The penta-coordinated silicon catalyst is generally used in an amount of 10 to 1,000 ppm based on the total siloxanes.

Examples of the branched organopolysiloxanes are those expressed by the following mixtures (1) and (2):

(1) A branched organopolysiloxane comprising:

| | |
|---|---|
| $(CF_3-CH_2-CH_2)(CH_3)SiO$ units | 93.5 mol % |
| $(C_6H_5)SiO_{1.5}$ units | 3.0 mol %, and |
| $(CH_2=CH)(CH_3)_2SiO_{0.5}$ units | 3.5 mol %, and |

(2) A branched organopolysiloxane comprising:

| | |
|---|---|
| $(CF_3-CH_2-CH_2)(CH_3)SiO$ units | 89.0 mol % |
| $(C_6H_5)SiO_{1.5}$ units | 5.0 mol %, |
| $(CH_2=CH)(CH_3)_2SiO_{0.5}$ units | 3.0 mol %, and |
| $(CH_3)_3SiO_{0.5}$ units | 3.0 mol %. |

The viscosity of the branched organopolysiloxanes at 25° C. is usually from 50 to 100,000 cP, more preferably from 300 to 5,000 cP.

In this invention, the branched organopolysiloxane may be used singly or as a combination of two or more of the branched organopolysiloxanes.

(B) Organohydrogen Polysiloxane

The organohydrogen polysiloxane, component (B), in this invention reacts with vinyl groups in component (A) to form a cured gel product, therefore it contains at least one hydrogen atom, preferably 2 to 12 hydrogen atoms, bound to silicon atoms within a molecule.

The organohydrogen polysiloxane is added in an amount sufficient to provide 0.3 to 2.0 moles of hydrogen atoms bound to silicon atoms, i.e., SiH groups, per 1 mole of vinyl group bound to silicon atoms in the component (A). Either more or less amount of hydrogen atoms bound to silicon atoms will lead to a cured gel product with an insufficient heat resistance.

These hydrogen atoms may be bound to silicon atoms at the end of and/or in the middle of the molecular chain. In addition, the polysiloxane skeleton of the organohydrogen polysiloxane may be linear or branched. Further, it is preferred for the component (A) and the component (B), organohydrogen polysiloxane, to be compatible. Therefore, the organohydrogen polysiloxane, component (B), preferably contains fluorine atoms. As the content of fluorine in the component (A) increases, the organohydrogen polysiloxane should also have a higher fluorine content to remain compatible.

The organo groups bonded to silicon atoms in the organohydrogenpolysiloxane may be selected from the group consisting of alkyl groups such as methyl, ethyl, propyl, butyl, hexyl and cyclohexyl; aryl groups such as phenyl, and tolyl; halogeno-substituted alkyl groups such as chloromethyl and 3,3,3-trifluoropropyl; wherein methyl and 3,3,3-trifluoropropyl groups are preferred.

Examples of organohydrogen polysiloxanes suitably utilized in this invention are:

[(CH₃)₃SiO₀.₅]₂[(CF₃CH₂CH₂)(CH₃)SiO]₆[(CH₃)HSiO]₄, and
[(CH₃)₃SiO₀.₅][(CF₃CH₂CH₂)(CH₃)SiO]₆[(CH₃)HSiO]₃[(CH₃)₂HSiO₀.₅].

The viscosity of these organohydrogen polysiloxanes at 25° C. is preferably from 10 to 10,000 cP, more preferably from 50 to 1,000 cP. The organohydrogen polysiloxanes may be used singly or as a combination of two or more organohydrogen polysiloxanes.

(C) Addition Reaction Catalyst

The addition reaction catalyst, component (C), is utilized to promote curing through the addition reaction between the vinyl groups in component (A) and the SiH groups in component (B), and such a catalyst in the general sense is well known. Included are platinum and platinum group metal catalysts. Examples of the addition reaction catalyst are: chloroplatinic acid; alcohol denatured solution of chloroplatinic acid; alcohol denatured solution of chloroplatinic acid; coordinated compounds of chloroplatinic acid with olefins or vinyl siloxanes; tetrakis(triphenyl phosphine)palladium; and chlorotris(triphenyl phosphine)rhodium. Among these, platinum types are particularly desirable. These catalysts are added in an amount of 0.1 to 1,000 ppm (metal equivalent) based on the total weight of the (A) and (B) components.

Other additives

The organopolysiloxane compositions of this invention may comprise other additives besides the components (A) through (C). For example, the mechanical strength may be controlled by adding inorganic fillers such as: fumed silica, silica aerosol, precipitated silica, crushed silica, diatomaceous earth, iron oxide, alumina, zinc oxide, titanium oxide, calcium carbonate, magnesium carbonate, zinc carbonate, and carbon black. Further, hollow inorganic fillers, hollow organic fillers, and spherical fillers made of organosilicone resins and rubbers may be added.

It is also possible to control the curing reaction by adding reaction controllers such as cyclic compounds of polymethyl vinyl siloxanes, acetylene compounds and organic phosphorous compounds. The amount of these additives is variable, as long as they will not interfere with the properties of the obtained cured product.

Silicone Gel Compositions

The silicone gel compositions of this invention are prepared by mixing the above-described components uniformly. The compositions will form the cured gel products by heating at, for example, 60° to 200° C. The gel products have superior flexibility at low temperature and superior solvent resistance.

In conventional compositions for silicone gels, it is common to increase the content of 3,3,3-trifluoropropyl groups, in order to increase the solvent resistance. However, the cured gel products, obtained by the curing of the compositions which comprise linear organopolysiloxanes having a large amount of 3,3,3-trifluoropropyl groups and not having $RSiO_{1.5}$ units within the molecule, gradually undergo crystallization at low temperature and lose the flexibility characteristics desired of the silicone gels.

A characteristic of the composition in this invention is the employment of the branched organopolysiloxane, which comprises vinyl groups as well as 0.5 to 10 mol % of branching units expressed by $RSiO_{1.5}$, wherein R is as described above, within a molecule, as a base component. Utilization of this compound successfully leads to the formation of silicone gels which are superior in solvent resistance while maintaining flexibility at low temperature. Although not intending to be bound by this theory, it is speculated that the introduction of the branching units, $RSiO_{1.5}$, confuses the order in the polysiloxane, preventing the crystallization process, even at low temperature.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, cited above and below, and of corresponding application Japan 5-186887, filed Jun. 30, 1993, are hereby incorporated by reference.

EXAMPLES

In the following Examples and Comparison Examples, all the parts indicate parts by weight and the viscosity values were measured at 25° C.

EXAMPLE 1

Preparation of a branched organopolysiloxane (A-1) by Preparation Method 1

After uniformly mixing the following three chlorosilanes, hydrolysis was carried out by adding the mixture into 10000 g of water drop by drop:

| | |
|---|---|
| MeSiCl₃ | 149.6 g (1.0 mol) |
| (CF₃—CH₂—CH₂)(Me)SiCl₂ | 2111.0 g (10.0 mol), and |
| Me₃SiCl | 54.3 g (0.5 mol). |

Then the hydrolyzed solution mix was washed 5 times with water, then dehydrated using anhydrous sodium sulfate. The hydrolyzed product, T, was obtained.

Then, 166.8 g of the hydrolyzed product T, obtained above, was placed in a 1000 ml capacity flask along with the following two compounds:

| | |
|---|---|
| [(CF₃—CH₂—CH₂)(Me)SiO]₃ | 312.0 g and |
| [(CH₂=CH)(Me)₂Si]₂O | 18.6 g. |

Further, 0.24 g of trifluoromethane sulfonic acid was added as an equilibration catalyst and the mixture within the flask was stirred for 8 hours at 25° C.

After stirring, 10 g of sodium bicarbonate was added to the mixture in the 1000 ml capacity flask and the equilibration catalyst was neutralized by stirring for another 3 hours. Sodium bicarbonate and neutralized salt were filtered off and low boiling point compounds were removed by a heated distillation under reduced pressure. A branched organopolysiloxane with 1500 cP viscosity (A-1) was obtained. The composition of the obtained branched organopolysiloxane (A-1) was as shown below:

| (A-1) | (CF₃C₂H₄) | MeSiO₂/₂ | 89.6 mol %, |
|---|---|---|---|
| | | MeSiO₃/₂ | 2.99 mol %, |
| | | ViMe₂SiO₁/₂ | 5.97 mol %, and |
| | | Me₃SiO₁/₂ | 1.49 mol %. |

2) Preparation of an organohydrogen polysiloxane (B-1)

The following three compounds were placed in a 2000 ml capacity flask:

| | |
|---|---|
| [(CF₃—CH₂—CH₂)(Me)SiO]₃ | 936.6 g, |
| (HMeSiO)₄ | 240.4 g, and |
| Me₃SiOSiMe₃ | 162.2 g | along with 0.59 of trifluoromethane sulfonic acid of an equilibration catalyst and the mixture within the flask was stirred for 8 hours at 25° C.

After stirring, 10 g of sodium bicarbonate was added to the mixture in the 2000 ml capacity flask and the said equilibration catalyst was neutralized by stirring for another 3 hours. Sodium bicarbonate and neutralized salt were filtered off and low boiling point compounds were removed by a heated distillation under reduced pressure. An organohydrogen polysiloxane (B-1) was obtained. The molecular structure of the synthesized organohydrogen polysiloxane (B-1) is shown by the formula below and its viscosity was 31 cP at 25° C.

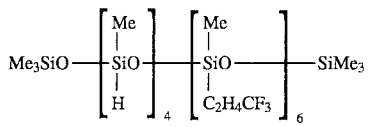

3) Preparation of a composition (I) for silicone gel

A vinyl siloxane complex of chloroplatinic acid was added to 100 parts of the branched organopolysiloxane (A-1), then 0.1 part of ethynyl cyclohexanol was further added and uniformly mixed. Then 5.2 parts of the organohydrogen polysiloxane (B-1) was added to the obtained mixture and mixed to uniformity. The amount of the vinyl siloxane complex of chloroplatinic acid added was 5 ppm of platinum equivalent based on the total weight of the branched organopolysiloxane (A-1) and the organohydrogen polysiloxane (B-1). A composition (I) for silicone gel was thus prepared.

4) Physical property tests for a cured gel product

A transparent cured gel product was obtained by heat curing of the composition (I) for silicone gel prepared as above, for an hour at 150° C. Penetration measurements at 25° C. and −50° C. and gasoline soaking tests were carried out for the cured gel product, by the methods described below. The results are shown in Table 1.

4-1) Penetration Measurement

Penetration was measured by using the ¼ scale cone as defined in the ASTM D 1403.

4-2) Gasoline Soaking Test 4-2-1) Swelling by Gasoline

The cured gel product (10 g) was soaked in 200 ml gasoline at 25° C. for 70 hours. After soaking, the residual gasoline on the surface of the cured product was wiped off, then the cured product was weighed. The ratio of weight increase compared to that prior to soaking was obtained in weight %.

4-2-2) Gasoline Extraction

The cured gel product (10 g) was soaked in 200 ml gasoline at 25° C. for 70 hours. After soaking, the cured product was air dried for 72 hours, then weighed. The ratio of weight decrease compared to that prior to soaking was obtained in weight %.

EXAMPLE 2

1) Preparation of a Branched Organopolysiloxane (A-2) by Preparation Method 2

The following two compounds were uniformly mixed along with 400.0 g of acetonitrile:

| | |
|---|---|
| [(CF₃—CH₂—CH₂)(Me)SiO]₃ | 468.0 g and |
| (C₆H₅)Si(OH)₃ | 15.61 g. |

While stirring this mixture at 20° C., 0.01 g of a penta-coordinated silicon catalyst expressed by the formula below was added and polymerization conducted for 5 hours:

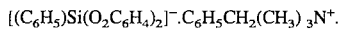

Then 30.0 g of vinyl dimethyl chlorosilane and 40.0 g of the compound expressed by the formula below were added to the polymerized mixture:

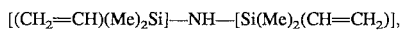

in order to carry out the silylation of the molecular terminals of the polymers prepared by the said polymerization. Then, acetonitrile was removed by a heated distillation under reduced pressure and the salt formed by the silylation was recovered by filtration. A branched organopolysiloxane with 2500 cP viscosity (A-2) was obtained. The composition of the obtained branched organopolysiloxane (A-2) was as shown below:

| (A-2) | (CF₃C₂H₄)MeSiO₂/₂ | 88.2 mol %, |
|---|---|---|
| | (C₆H₅)SiO₃/₂ | 2.94 mol %, and |
| | ViMe₂SiO₁/₂ | 8.82 mol %. |

2) Preparation of a Composition (II) for Silicone Gel

A vinyl siloxane complex of chloroplatinic acid was added to 100 parts of the branched organopolysiloxane (A-2), then 0.1 part of ethynyl cyclohexanol was further added and uniformly mixed. Then 4.1 parts of the organohydrogen polysiloxane (B-1), prepared in Example 1, was added to the obtained mixture and mixed to uniformity. The amount of the vinyl siloxane complex of chloropatinic acid added was 5 ppm of platinum equivalent based on the total weight of the branched organopolysiloxane (A-2) and the organohydrogen polysiloxane (B-1). A composition (II) for silicone gel was thus prepared.

3) Physical Property Tests for a Cured Gel Product

A transparent cured gel product was obtained by heat curing of the composition (II) for silicone gel prepared as above, for an hour at 150° C. Penetration measurements at 25° C. and −50° C. and gasoline soaking tests were carried out for the cured gel product, as described in Example 1. The results are shown in Table 1.

Comparison Example 1

1) Preparation of a linear organopolysiloxane (D-1)

The following two compounds were placed in a 1000 ml capacity flask:

| | |
|---|---|
| [(CF₃—CH₂—CH₂)(Me)SiO]₃ | 468.0 g and |
| [(CH₂=CH)(Me)₂Si]₂O | 18.6 g. |

Further, 0.24 g of trifluoromethane sulfonic acid was added as an equilibration catalyst and the mixture within the flask was stirred for 8 hours at 25° C.

After stirring, 10 g of sodium bicarbonate was added to the mixture in the 1000 ml capacity flask and the equilibration catalyst was neutralized by stirring for another 3 hours. Sodium bicarbonate and neutralized salt were filtered off and low boiling point compounds were removed by a heated distillation under reduced pressure. A linear organopolysiloxane with 900 cP viscosity (D-1) was obtained. The molecular structure of the obtained organopolysiloxane (D-1) is shown by the formula below.

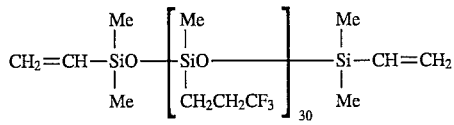

2) Preparation of a Composition (III) for Silicone Gel

A vinyl siloxane complex of chloroplatinic acid was added to 100 parts of the linear organopolysiloxane (D-1), then 0.1 part of ethynyl cyclohexanol was further added and uniformly mixed. Then 8.2 parts of the organohydrogen polysiloxane (B-1), used in Example 1, was added to the obtained mixture and mixed to uniformity. The amount of the vinyl siloxane complex of chloroplatinic acid added was 5 ppm of platinum equivalent based on the total weight of the linear organopolysiloxane (D-1) and the organohydrogen polysiloxane (B-1). A composition (III) for silicone gel was thus prepared.

3) Physical Property Tests for a Cured Gel Product

A transparent cured gel product was obtained by heat curing of the composition (III) for silicone gel prepared as above, for an hour at 150° C. Penetration measurements at 25° C. and −50° C. and gasoline soaking tests were carried out for the cured gel product, as described in Example 1. The results are shown in Table 1.

Comparison Example 2

1) Preparation of a Linear Organopolysiloxane (D-2)

The following three compounds were placed in a 1000 ml capacity flask:

| | |
|---|---|
| [(CF$_3$—CH$_2$—CH$_2$)(Me)SiO]$_3$ | 312.0 g, |
| [(Me)$_2$SiO]$_4$ | 74.0 g, and |
| [(CH$_2$=CH)(Me)$_2$Si]$_2$O | 18.6. |

Further, 0.20 g of the trifluoromethane sulfonic acid was added as an equilibration catalyst and the mixture within the flask was stirred for 8 hours at 25° C.

After stirring, 10 g of sodium bicarbonate was added to the mixture in the 1000 ml capacity flask and the equilibration catalyst was neutralized by stirring for another 3 hours. Sodium bicarbonate and neutralized salt were filtered off and low boiling point compounds were removed by a heated distillation under reduced pressure. A linear organopolysiloxane with 800 cP viscosity (D-2) was obtained. The molecular structure of the obtained organopolysiloxane (D-2) is shown by the formula below.

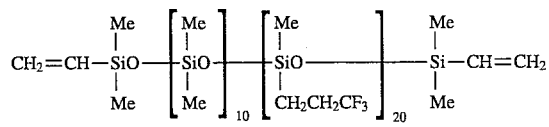

Here among the total RMeSiO units, wherein R is selected from a group of a methyl group and 3,3,3-trifluoropropyl group, in this linear organopolysiloxane (D-2), the ratio of units in which R is a 3,3,3-trifluoropropyl group is 67%, and the ratio of units with R being a methyl group is 33%.

2) Preparation of a Composition (IV) for Silicone Gel

A vinyl siloxane complex of chloroplatinic acid was added to 100 parts of the linear organopolysiloxane (D-2), then 0.1 part of ethynyl cyclohexanol was further added and uniformly mixed. Then 8.0 parts of the organohydrogen polysiloxane (B-1), used in Example 1, was added to the obtained mixture and mixed to uniformity. The amount of the vinyl siloxane complex of chloroplatinic acid added was 5 ppm of platinum equivalent based on organohydrogen polysiloxane (B-1). A composition (IV) for silicone gel was thus prepared.

3) Physical Property Tests for a Cured Gel Product

A transparent cured gel product was obtained by heat curing of the composition (IV) for silicone gel prepared as above, for an hour at 150° C. Penetration measurements at 25° C. and −50° C. and gasoline soaking tests were carried out for the cured gel product, as described in Example 1. The results are shown in Table 1.

Comparison Example 2 confirms that the reduction of 3,3,3-trifluoropropyl group content by the introduction of dimethyl siloxane (Me$_2$SiO) units into the linear organopolysiloxane will improve the penetration at −50° C., i.e., prevent the flexibility from lowering at low temperature, however, it will also enlarge the degree of swelling by gasoline and hinder the solvent resistance.

TABLE 1

| | Ex. 1 | Ex. 2 | C. Ex. 1 | C. Ex. 2 |
|---|---|---|---|---|
| Siloxane Structure | Branched | Branched | Linear | Linear |
| Ratio of units with R = 3,3,3-trifluoropropyl group per total RMeSiO units | 100% | 100% | 100% | 67% |
| Polymerization catalyst | Acid | Penta-coordinated silicon catalyst | Acid | Acid |
| Penetration | | | | |
| 25° C. | 72 | 65 | 68 | 62 |
| −50° C. | 70 | 63 | 20 | 60 |
| Gasoline soaking (wt %) | | | | |
| Swelling | 14 | 12 | 13 | 23 |
| Extraction | 12 | 1 | 11 | 11 |

The compositions for the silicone gel in this invention provide cured silicone gel products which have a superior solvent resistance towards, for example, gasoline, while maintaining flexibility at low temperature.

The preceding examples can be repeated with similar success by substituting the generically or specifically described reactants and/or operating conditions of this invention for those used in the preceding examples. From the foregoing description, one skilled in the art can easily ascertain the essential characteristics of this invention, and without departing from the spirit and scope thereof, can make various changes and modifications of the invention to adapt it to various usages and conditions.

What is claimed is:

1. A composition for a solvent resistant silicone gel which comprises:

(A) 100 parts by weight of a branched organopolysiloxane having vinyl groups which comprises:

| (CF$_3$—CH$_2$—CH$_2$)(CH$_3$)SiO units | 70.0–98.5 mol % |
| --- | --- |
| RSiO$_{1.5}$ units | 0.5–10.0 mol %, and |
| (CH$_2$=CH)(CH$_3$)$_2$SiO$_{0.5}$ units | 1.0–10.0 mol %, | wherein R is a group selected from a 3,3,3-trifluoropropyl group, a phenyl group, a methyl group and a vinyl group, (B) 0.1 to 30 parts by weight of an organohydrogen polysiloxane having at least one hydrogen atom bound to a silicon atom within the molecule, and (C) an addition reaction catalyst.

2. The composition of claim 1, wherein the branched organopolysiloxane (A) further comprises 10 mol % or less of (CH$_3$)$_3$SiO$_{0.5}$ units.

3. The composition of claim 1, wherein the branched organopolysiloxane (A) contains 2.0 to 5.0 mol % of RSiO$_{1.5}$ units.

4. The composition of claim 1, wherein the branched organopolysiloxane (A) contains 0.5 to 8.0 mol % of vinyl groups.

5. The composition of claim 1, wherein the branched organopolysiloxane (A) has a viscosity at 25° C. of from 50 to 100,000 cP.

6. The composition of claim 1, wherein the organohydrogen polysiloxane (B) is present in an amount sufficient to provide 0.3 to 2.0 moles of hydrogen atoms bound to silicon atoms per 1.0 mole of vinyl groups bound to silicon atoms in the branched organopolysiloxane (A).

7. The composition of claim 1, wherein the organohydrogen polysiloxane (B) contains fluorine atoms.

8. The composition of claim 1, wherein the organohydrogen polysiloxane (B) has a viscosity at 25° C. of 10 to 10,000 cP.

9. The composition of claim 1, wherein the addition reaction catalyst is a platinum or platinum group metal catalyst.

10. The composition of claim 1, wherein the branched organopolysiloxane containing vinyl groups, (A), is prepared by ring-opening polymerizing, in the presence of an alkali or acid equilibration catalyst, raw materials selected from cyclic trimers of methyl-3,3,3-trifluoro-propylsiloxane, vinyl group-containing organodisiloxanes and cohydrolyzed products of silanes having RSiO$_{1.5}$ units obtained by cohydrolyzing organotrichlorosilanes with other chlorosilanes.

11. A composition for the solvent resistant silicone gel described in claim 1, wherein said component (A) is derived from a ring-opening polymerization product which was prepared by the ring-opening polymerization of cyclic trimers of methyl-3,3,3-trifluoropropyl siloxane in the presence of a penta-coordinated silicon catalyst at a temperature of at most 50° C.

12. A composition of claim 10, wherein the penta-coordinated silicon catalyst is of the following formula

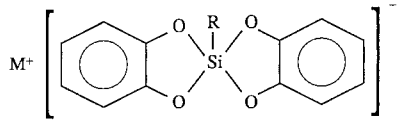

wherein M$^+$ is either BzMe$_3$N$^+$, Bu$_4$N$^+$, Me$_4$N$^+$, Li$^+$, Na$^+$ or K$^+$, wherein Me, Bu and Bz are a methyl group, a butyl group, and a benzyl group, respectively, and R is selected from a 3,3,3-trifluoropropyl group, a phenyl group, a methyl group and a vinyl group.

13. A silicone gel obtained by heat curing of a composition of claim 1.

14. A silicone gel of claim 13 having a penetration, measured by using the ¼ inch scale cone as defined by ASTM D1403 of 0 to 200 at 25° C.

15. The composition of claim 1, wherein the branched organopolysiloxane contains 75 to 95 mol % of (CF$_3$—CH$_2$—CH$_2$)(CH$_3$)SiO units.

16. The composition of claim 1, wherein the branched organopolysiloxane contains 3.0 to 7.0 mol % of (CH$_2$=CH)(CH$_3$)$_2$SiO$_{0.5}$ units.

17. The composition of claim 1, wherein the organohydrogen polysiloxane contains 3,3,3-trifluoropropyl groups.

* * * * *